(12) United States Patent
Lee et al.

(10) Patent No.: US 8,470,150 B2
(45) Date of Patent: Jun. 25, 2013

(54) METHOD OF FABRICATING ELECTRODE STRUCTURES ON SUBSTRATE

(75) Inventors: Kun-Mu Lee, Yunlin County (TW); Sz-Ping Fu, Hsinchu County (TW); Wei-Hao Chiu, Taipei (TW); Chuan-Ya Hung, Hsinchu County (TW)

(73) Assignee: Industrial Technology Research Institute, Hsinchu (TW)

( * ) Notice: Subject to any disclaimer, the term of this patent is extended or adjusted under 35 U.S.C. 154(b) by 283 days.

(21) Appl. No.: 13/085,452

(22) Filed: Apr. 12, 2011

(65) Prior Publication Data

US 2012/0055796 A1 Mar. 8, 2012

(30) Foreign Application Priority Data

Sep. 8, 2010 (TW) .............................. 99130285 A

(51) Int. Cl.
*C25D 13/02* (2006.01)

(52) U.S. Cl.
USPC .......................................... 204/490; 204/491

(58) Field of Classification Search
USPC ................................. 204/490, 491
See application file for complete search history.

(56) References Cited

U.S. PATENT DOCUMENTS

| | | | |
|---|---|---|---|
| 5,482,571 A | 1/1996 | Yamada et al. |
| 6,565,763 B1 | 5/2003 | Asakawa et al. |
| 6,664,071 B1 | 12/2003 | Windhab et al. |
| 6,797,769 B2 | 9/2004 | Akutsu et al. |
| 6,881,604 B2 | 4/2005 | Lindstrom et al. |
| 6,929,970 B2 | 8/2005 | Andriessen et al. |
| 7,090,784 B2 | 8/2006 | Asakawa et al. |
| 7,097,781 B2 | 8/2006 | Asakawa et al. |
| 7,224,036 B2 | 5/2007 | Kojima et al. |
| 7,422,922 B2 | 9/2008 | Morooka et al. |
| 7,449,372 B2 | 11/2008 | Fujii et al. |
| 7,517,466 B2 | 4/2009 | Asakawa et al. |
| 7,569,765 B2 | 8/2009 | Matsui et al. |
| 7,638,807 B2 | 12/2009 | Yukinobu |
| 7,670,884 B2 | 3/2010 | Fujii et al. |
| 7,671,272 B2 | 3/2010 | Sohn et al. |
| 8,211,743 B2 * | 7/2012 | Srinivasan et al. ............ 438/104 |

FOREIGN PATENT DOCUMENTS

| | | |
|---|---|---|
| CN | 1763261 A | 4/2006 |
| CN | 101373794 A | 2/2009 |
| CN | 201302932 Y | 9/2009 |
| CN | 101665973 A | 3/2010 |
| EP | 1489628 A1 | 12/2004 |
| TW | 200932958 A | 8/2009 |

OTHER PUBLICATIONS

Takeshi Yamaguchi et al., "Highly Efficient Plastic Substrate Dye-Sensitized Solar Cells Using a Compression Method for Preparation of $TiO_2$ Photoelectrodes," Chemical Communications, Sep. 2007, pp. 4767-4769, issue 45, The Royal Society of Chemistry, US.

Henrik Lindstrom et al., "A New Method to Make Dye-Sensitized Nanocrystalline Solar Cells at Room Temperature," Journal of Photochemistry and Photobiology A:Chemistry, Jul. 2001, pp. 107-112, Issue 145, Elsevier, US.

China Patent Office, Office Action, Patent Appliction Serial No. 201010532040.2, Feb. 4, 2013, China.

* cited by examiner

Primary Examiner — Kishor Mayekar

(57) ABSTRACT

Methods for fabricating electrode structures on a substrate are presented. The fabrication method includes providing a substrate with a patterned metal layer thereon, defining an electrode area. A passivation glue is formed on the patterned metal layer. An electrode layer is formed in the electrode area. A filling process is performed to deposit nano metal oxides on the electrode layer to extensively fill the entire electrode area.

12 Claims, 4 Drawing Sheets

METHOD OF FABRICATING ELECTRODE STRUCTURES ON SUBSTRATE

CROSS REFERENCE TO RELATED APPLICATIONS

This Application claims priority of Taiwan Patent Application No. 099130285, filed on 8, Sep. 2010, the entirety of which is incorporated by reference herein.

BACKGROUND OF THE INVENTION

1. Field of the Invention

The invention relates in general to a method of fabricating electrode structures on a substrate, and more particularly to a method of improving output current and output voltage of a dye-sensitized solar cell (DSSC).

2. Description of the Related Art

Dye-sensitized solar cells (DSSC) have many advantages, such as low cost, high efficiency, easy fabrication and high plasticity. Further, Dye-sensitized solar cells (DSSC) can generate electric power with an indoor light source which is not limited by sunray incident angles. A standard dye-sensitized solar cell includes a substrate (glass substrate or thin film substrate), a transparent conductive film, a working electrode (including a semiconductor layer and dye), an electrolytic material (electrolyte), and an counter electrode coated with a transparent conductive film and a platinum catalyst on a substrate. Output efficiency of dye-sensitized solar cell module is only about 6-8% and output power is not high enough. Therefore, it is important to improve efficiency and output power of dye-sensitized solar cells.

Generally, patterned silver lines and passivation glues are formed on a conductive substrate using a screen printing method when fabricating sub-module cells of dye-sensitized solar cells. During the design process, a specific buffer space between the working electrode and the passivation glue is left, which reduces the active area of the sub-module working electrodes.

Electrophoretic deposition has many advantages. For example, electrophoretic deposition has a fast deposition rate and can be performed on any shape of conductive subject, and the equipment for electrophoretic deposition is simple to operate. Electrophoretic deposition comprises dispersing and suspending sol particles uniformly in a liquid according to control of a surface state of the sol particles, immersing two electrodes in a solution, applying a DC electric field between the two electrodes for the particles with charges moving toward the electrode having reverse electric characteristics. The particles are finally deposited on the substrate to form a film.

China pattern CN 1763261A discloses electrophoretic depositing a $TiO_2$ film using cyclic voltammetry on a glass conductive substrate. The conductive substrate with an electrode structure can be used on dye-sensitized solar cells. However, the conventional electrophoretic deposition method has many limits. For example, cyclic voltammetry is required when fabricating $TiO_2$ electrodes. Therefore, deposition of the cathode in an electrophoretic tank is limited. An electrophoretic liquid must comprise a salt electrolyte and an electrode is required to be treated using a micro wave of under 400-500° C. An electrode with desired quality cannot be obtained merely using electrophoretic deposition.

BRIEF SUMMARY OF INVENTION

A method for fabricating electrode structures on a substrate is disclosed, comprising: providing a substrate having a patterned metal layer thereon to define an electrode area, wherein the patterned metal layer is covered by a passivation glue and an electrode layer is formed in the electrode area; and performing a filling step to deposit a nano metal oxide on the electrode area to extensively fill the entire electrode area.

A method for fabricating electrode structures on a substrate is disclosed, comprising: providing a transparent conductive substrate having a patterned metal layer thereon to define an electrode area, wherein the patterned metal layer is covered by a passivation glue and an electrode layer is formed in the electrode area; performing a first electrophoretic deposition to deposit small diameter nano metal oxide particles to the space between the electrode layer and the passivation glue; and performing a second electrophoretic deposition to deposit large diameter nano metal oxide particles to the space between the electrode layer and the passivation glue.

BRIEF DESCRIPTION OF DRAWINGS

The invention can be more fully understood by reading the subsequent detailed description and examples with references made to the accompanying drawings, wherein.

DETAILED DESCRIPTION OF INVENTION

Figure 1:
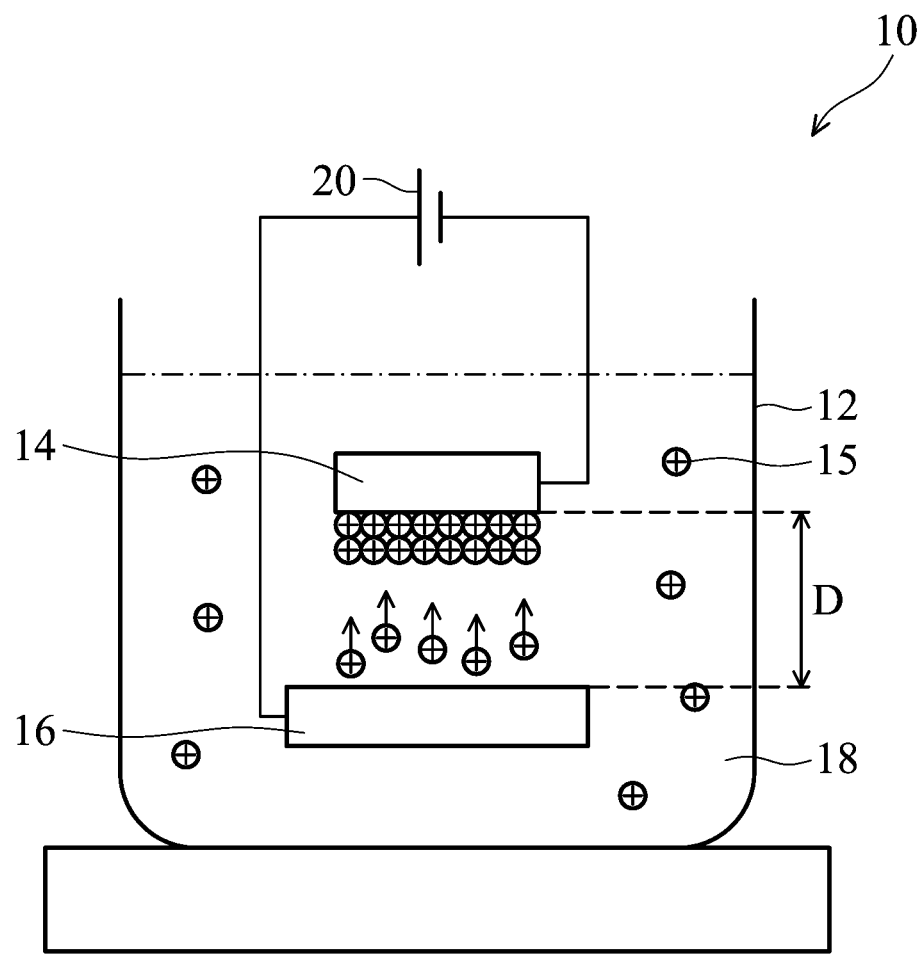
FIG. 1 shows a sketch drawing of an electrophoretic deposition equipment of an embodiment of the invention.

Embodiments of the invention are illustrated in company with drawings. In the description of the figures and the specification, the like or the same portions use the same reference number. In the drawings, shape or thickness of the embodiments can be enlarged and can be simplified for convenience. Moreover, the elements in the drawings are described respectively. It is understood that the elements which are not shown or described in the figure are for people having standard knowledge in the art. Furthermore, the specific embodiments are only in the specific forms to illustrate the invention, and not used to limit the invention.

An embodiment of the invention uses electrophoretic deposition to fill up the space between a working electrode and a passivation glue to increase the active area of the working electrodes such that output current and output power are increased.

FIG. 1 shows a sketch drawing of an electrophoretic deposition equipment of an embodiment of the invention. As shown in FIG. 1, nano metal oxide powders 15, such as $TiO_2$ powders, are uniformly suspended in the solvent 18, such as IPA, in the electrophoretic liquid tank 12. A $TiO_2$ electrode is provided. Said $TiO_2$ electrode can be formed by screen printing or any other method. The $TiO_2$ electrode is used as a cathode 14, an ITO glass is used as an anode 16, and an electrophoretic liquid is interposed between the two electrodes. The $TiO_2$ electrode and the ITO glass are spaced apart by a distance D. Electrophoretic deposition is conducted using a DC power supply 20 with a constant electric current or constant electric potential. Generally, since the $TiO_2$ particles have positive charges on the surface, it is likely to be deposited on the cathode. Basically, the electrophoretic deposition includes two steps. One is electrophoresis and the other is deposition. In electrophoresis, the particles with charges in the liquid move due to a electric field. In deposition, the particles neighboring the substrate are deposited on the substrate to form a layer with collected and condensed particles.

Figure 2A:
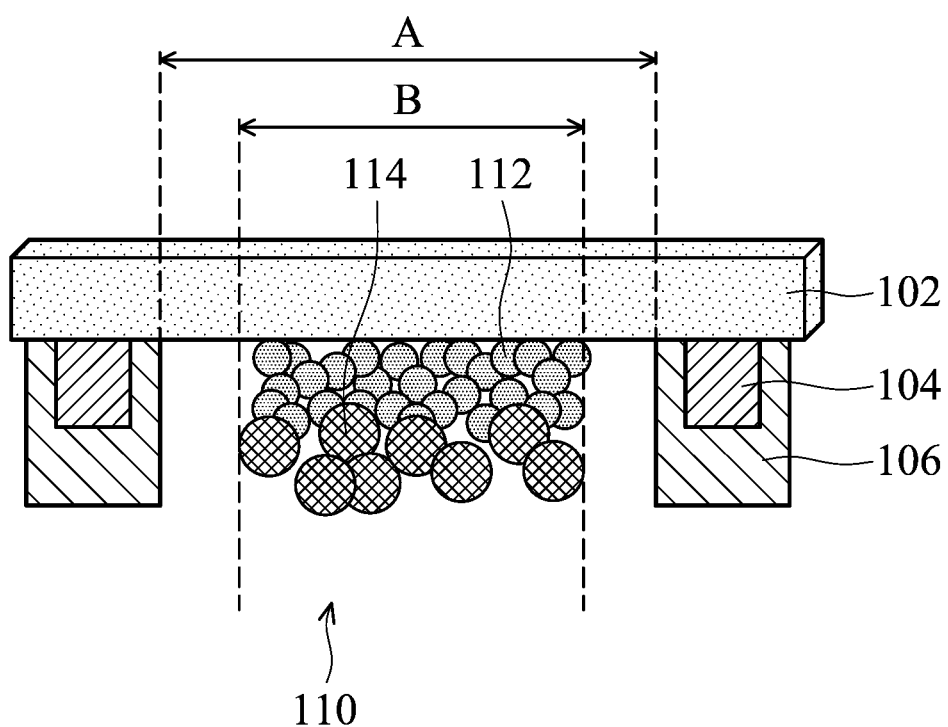
FIG. 2A and FIG. 2B show a sketch drawing of fabrications of electrode structures of a substrate of an embodiment of the invention.
Figure 2B:
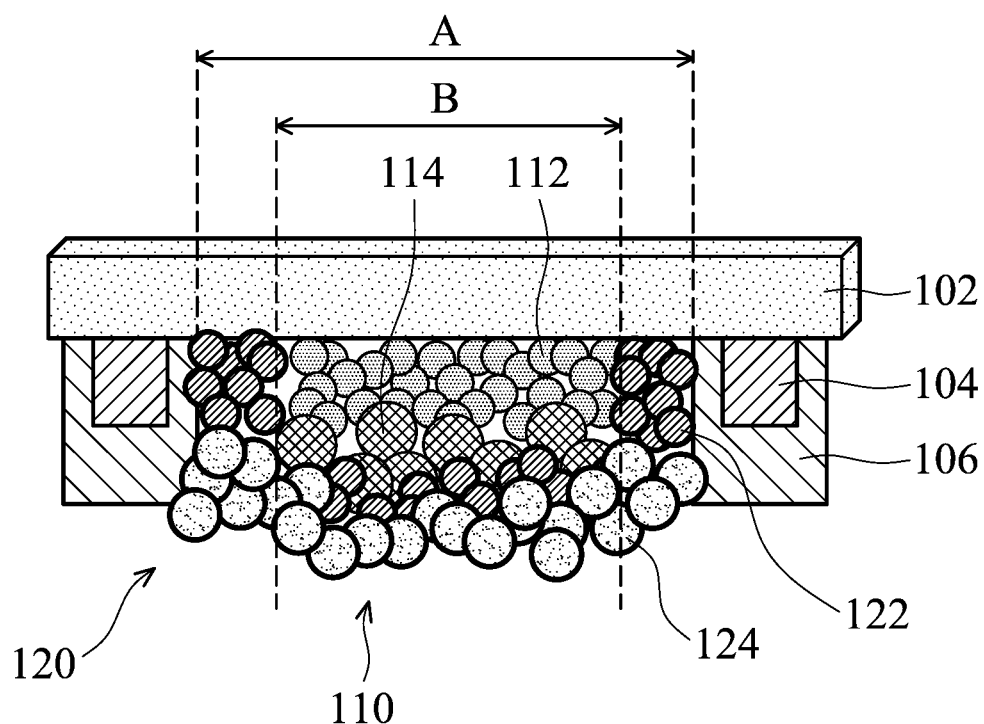

FIG. 2A and FIG. 2B shows a sketch drawing of fabrications of electrode structures of a substrate of an embodiment of the invention. First, referring to FIG. 2A, a substrate 102, such as transparent conductive oxide (TCO), is provided. A patterned metal layer 104 such as a patterned silver layer is formed on the substrate, thereby defining an electrode area A, wherein a passivation glue 106 covers the patterned metal layer 104. In an embodiment, an electrode layer 110 comprising a small diameter sub-electrode layer 112 and a large diameter sub-electrode layer 114 is filled into the electrode area A. For process convenience, the actual area B of the electrode layer 110 is less than the electrode area A. Therefore, a space between the electrode layer 110 and the passivation glue 106 is left. Therefore, an embodiment of the invention utilizes an electrophoretic deposition to fill $TiO_2$ into the space between the electrode layer 110 and the passivation glue 106.

Next, referring to FIG. 2B, a filling step is performed to deposit a nano metal oxide layer 120 on the electrode layer 110 to fill up the entire electrode area. The filling step comprises performing an electrical deposition method, such as electrophoretic deposition. In an embodiment, the electrophoretic deposition comprises providing a suspension of the nano metal oxide layer, immersing the substrate into the suspension, and applying an electric field by implementing the substrate as cathode and at least one anode to electrophoretically deposit the nano metal oxide layer. The electrode layer 110 and the nano metal oxide layer 120 can be formed of the same material or different materials. The nano metal oxide layer 120 can comprises titanium oxide ($TiO_x$), titanium dioxide, zinc oxide, tin oxide, silicon oxide, other suitable semiconductor oxide materials or combinations thereof. In an embodiment, after electrophoretic deposition, the electrode is about 0.1 μm~50 μm thick. Nano metal oxide formed by electrophoretic deposition can have a diameter of substantially between 5 nm and 400 nm.

In another embodiment of the invention, a first electrophoretic deposition is performed to deposit small diameter nano metal oxide particles 122, filling the space between the electrode layer and the passivation glue, wherein the small diameter metal oxide particles have a diameter of about 5 nm~50 nm, and a second electrophoretic deposition is performed to deposit large diameter nano metal oxide particles 124, filling the space between the electrode layer and the passivation glue, wherein the large diameter metal oxide particles have a diameter of about 50 nm~400 nm. The first electrophoretic deposition comprises providing a suspension of the small diameter nano metal oxide particles, immersing the substrate into the suspension, and applying an electric field by implementing the substrate as cathode and at least one anode to electrophoretically deposit the small diameter nano metal oxide particles. The second electrophoretic deposition comprises providing a suspension of the large diameter nano metal oxide particles, immersing the substrate into the suspension, and applying an electric field by implementing the substrate as cathode and at least one anode to electrophoretically deposit the large diameter nano metal oxide particles. It is noted that large diameter metal oxide particles are helpful for scattering of incident photons to increase absorbing efficiency of photons. In another embodiment of the invention, the nano metal oxide formed by electrophoretic deposition can be mixed randomly and deposit distribution can be controlled. For example, smaller diameter metal oxide particles can first be deposited and large diameter metal oxide particles can then be deposited.

The electrophoretic deposition illustrated in the embodiment described above not only can fill the voids in the scattering layer formed by screen printing, but also can fill the space between the working electrode and the passivation glue to increase the active area about 20%. The invention can further perform multiple depositions which changes the diameter and type of $TiO_2$ particles, thus forming $TiO_2$ electrodes with different distributions to increase use of incident light for increasing output current.

A plurality of examples is described below to illustrate the method of fabricating electrode structures on a substrate of the invention.

FIRST EXAMPLE

Step 1 (fabricating working electrodes): titanium dioxide electrodes (about 18 μm thick), patterned silver lines and a glass glue for protecting the silver lines were formed by screen printing on a transparent conductive substrate (FTO/glass). Then, the transparent conductive substrate and elements formed thereon were sent to a high temperature furnace to sinter at 500° C. for 30 minutes.

Step 2 (fabricating counter electrodes): platinum counter electrodes, patterned silver lines and a glass glue for protecting the silver lines were formed by screen printing on a transparent conductive substrate (FTO/glass). Then, the transparent conductive substrate and elements formed thereon were sent to a high temperature furnace to sinter at 500° C. for 30 minutes.

Step 3: 1.25 gram of a titanium dioxide nano powder (fabricated by Degussa company. model number P90, powder diameter 15~20 nm) was added to 500 ml of an IPA solution. The solution was stirred for 6 hours to uniformly disperse the titanium dioxide nano powder.

Step 4: The electrode substrate fabricated in step 1 was immersed in the solution fabricated in step 3. A negative electrode of a power supply (model number Keithley 2400) was connected to a substrate, and a positive electrode was connected to a bottom conductive electrode. The positive electrode and the negative electrode were separated by about 1 cm.

Step 5: The power supply was set as a constant current of 100 mA and a titanium dioxide was deposited on the working electrode fabricated in step 1 by electrophoretic deposition by durations. The depositing duration can be 1 min, 3 min, 5 min and 7 min. In addition, titanium dioxide with a diameter of about 100 nm can optionally be deposited for 4 minutes.

Step 6: After the electrophoretic deposition was completed, the transparent conductive substrate and elements formed thereon were stood at 25° C. for 3 hours and then sent to a high temperature furnace to perform a second sintering process at 500° C.

Step 7: The electrode formed in the step 5 was immersed in a $3\times10^{-4}$ M of N719 dye solution for 24 hours at room temperature, and then cleaned with acetone and left still.

Step 8: The counter electrode formed in step 2 and the working electrode having absorbed the dye in step 7 were adhered with thermoplastic plastics. An electrolyte containing $I^-/I_3^-$ was injected into the space between the two electrodes. The cell was packaged and the efficiency of the cell was tested.

The experiment results are shown in Table 1.

TABLE 1

| Depositing time | TiO$_2$ thickness (μm) | Short circuit current Isc (mA) | Short circuit current intensity Jsc (mA/cm$^2$) | Open-loop voltage Voc (V) | Fill Factor FF | light-to-electric energy conversion efficiency η (%) | Max output power Pmax (mW) |
|---|---|---|---|---|---|---|---|
| Non-electrophoretic deposition TiO$_2$ (Blank) | 20.24 | 31.63 | 15.82 | 0.66 | 0.63 | 6.64 | 13.28 |
|  |  | 31.63 | 15.82 | 0.68 | 0.65 | 6.94 | 13.87 |
| 1 min | 42.64 | 35.80 | 17.90 | 0.66 | 0.65 | 7.66 | 15.32 |
|  |  | 35.26 | 17.63 | 0.67 | 0.63 | 7.42 | 14.83 |
| 3 min | 44.55 | 35.06 | 17.53 | 0.66 | 0.63 | 7.37 | 14.74 |
|  |  | 34.19 | 17.09 | 0.66 | 0.61 | 6.92 | 13.83 |
| 5 min | 46.51 | 34.03 | 17.02 | 0.67 | 0.65 | 7.34 | 14.68 |
|  |  | 34.53 | 17.26 | 0.66 | 0.63 | 7.18 | 14.36 |
| 7 min | 46.71 | 33.88 | 16.94 | 0.66 | 0.64 | 7.23 | 14.47 |
|  |  | 34.31 | 17.15 | 0.65 | 0.64 | 7.05 | 14.10 |

Condition:
dye/electrolyte N719/0.6M PMII + 0.1M LiI + 0.05M I$_2$ + 0.5M TBP in AN.
Height of silver line: 10 μm

SECOND EXAMPLE

Step 1 (fabricating working electrodes): titanium dioxide electrodes (about 18 μm thick and having a diameter of 50-100 nm), patterned silver lines and glass glue for protecting the silver lines were formed by screen printing on a transparent conductive substrate (FTO/glass). Then, the transparent conductive substrate and elements formed thereon were sent to a high temperature furnace to sinter at 500° C. for 30 minutes.

Step 2 (fabricating counter electrodes): platinum counter electrodes, patterned silver lines and glass glue for protecting the silver lines were formed by screen printing on a transparent conductive substrate (FTO/glass). Then, the transparent conductive substrate and elements formed thereon were sent to a high temperature furnace to sinter at 500° C. for 30 minutes.

Step 3: 1.25 gram of a titanium dioxide nano powder (fabricated by Degussa company. model number P90, powder diameter 15~20 nm) was added to 500 ml of an IPA solution. The solution was stirred for 6 hours to uniformly disperse the titanium dioxide nano powder.

Step 4: The electrode substrate fabricated in step 1 was immersed in the solution fabricated in step 3. A negative electrode of a power supply (model number Keithley 2400) was connected to the substrate, and a positive electrode was connected to a bottom conductive electrode. The positive electrode and the negative electrode were separated by about 1 cm.

Step 5: The power supply was set at 100 mA constant current of 100 mA, and a 100 nm thick titanium dioxide was formed on the working electrode fabricated in step 1 by electrophoretic deposition for one minute.

Step 6: After the electrophoretic deposition was completed, the transparent conductive substrate and elements formed thereon were stood at 25° C. for 3 hours and then sent to a high temperature furnace to perform a second sintering process at 500° C.

Step 7: The electrode formed in the step 5 was immersed in a 3×10$^{-4}$ M of N719 dye solution for 24 hours at room temperature, and then cleaned with acetone and left still.

Step 8: The counter electrode in step 2 and the working electrode having absorbed the dye in step 7 were adhered with thermoplastic plastics. An electrolyte containing I$^-$/I$_3^-$ was injected into the space between the two electrode and then the cell was packaged.

Figure 3:
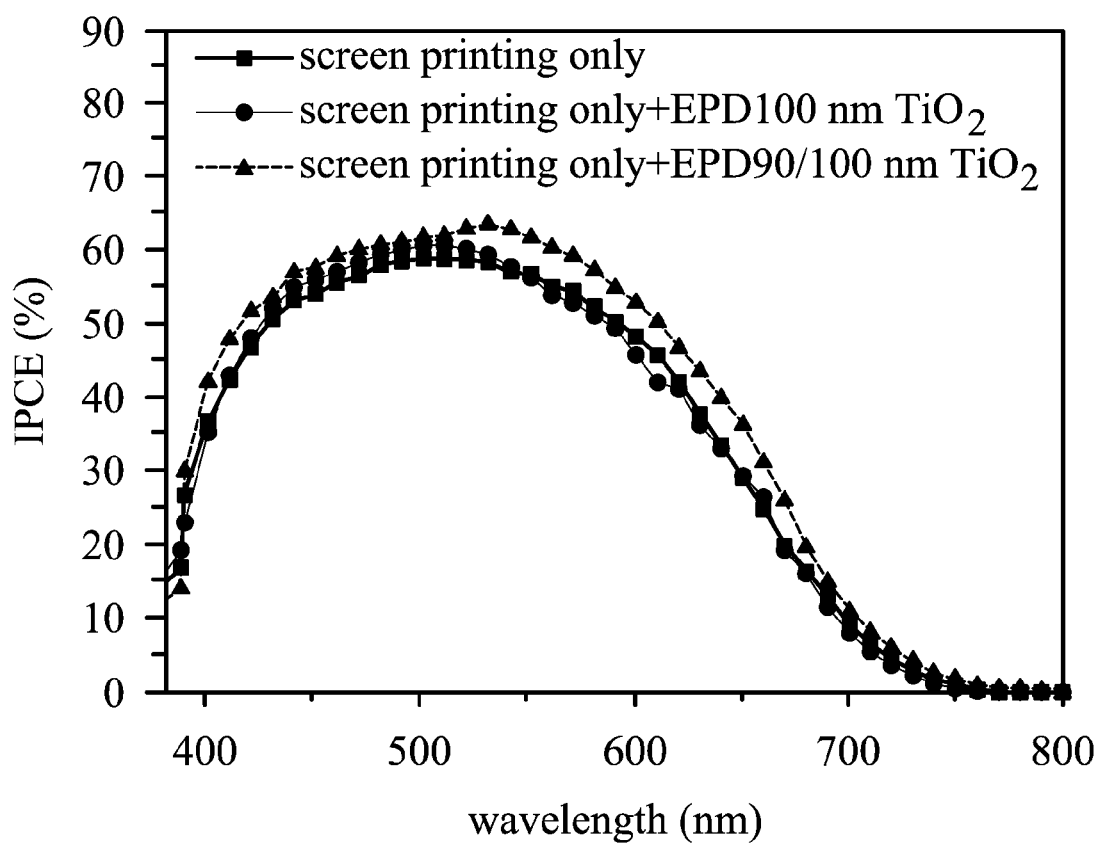
FIG. 3 shows the result of comparing an incident wave length and incident photo-to-electron conversion efficiency (IPCE) between a dye-sensitized solar cell with a working electrode only formed by a screen printing and dye-sensitized solar cell with a working electrode treated with filling using electrophoretic deposition.

FIG. 3 shows the result of comparing an incident wave length and incident photo-to-electron conversion efficiency (IPCE) between a dye-sensitized solar cell with a working electrode only formed by screen printing (omit step 3 to step 6) and dye-sensitized solar cell with a working electrode treated with filling using electrophoretic deposition. As shown in FIG. 3, electrophoretic deposition can increase the operating factor of a cell with respect to light having long wavelengths (50 nm~750 nm).

The embodiment disclosing filling of the space between a working electrode and a passivation glue of silver lines using electrophoretic deposition can increase active area of TiO$_2$ electrodes and thus increase output current and output power of devices. For example, electrophoretic deposition can effectively fill the space between a TiO$_2$ electrode and a passivation glue of silver lines to increase an active area a 0.5 cm×4 cm cell by 20%. The invention can increase output current from 31.6 mA to 35.8 mA, which increases about 13% of output current. The invention can increase output power from 13.28 mW to 15.32 mW, which increases about 15% of output power.

While the invention has been described by way of example and in terms of the preferred embodiments, it is to be understood that the invention is not limited to the disclosed embodiments. It is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method for fabricating electrode structures on a substrate, comprising:
   providing a substrate having a patterned metal layer thereon to define an electrode area, wherein the patterned metal layer is covered by a passivation glue and an electrode layer is formed in the electrode area; and
   performing a filling step to deposit a nano metal oxide on the electrode area to fill the electrode area by an electrophoretic deposition.

2. The method for fabricating electrode structures on a substrate as claimed in claim 1, wherein the electrophoretic deposition comprises:
providing a suspension of the nano metal oxide;
immersing the substrate into the suspension; and
applying an electric field by implementing the substrate as cathode and at least one anode to electrophoretically deposit the nano metal oxide.

3. The method for fabricating electrode structures on a substrate as claimed in claim 1, wherein the nano metal oxide comprises titanium oxide, titanium dioxide, zinc oxide, tin oxide, silicon oxide or combinations thereof.

4. The method for fabricating electrode structures on a substrate as claimed in claim 1, wherein the filling step comprises:
performing a first electrophoretic deposition to deposit small diameter nano metal oxide particles; and
performing a second electrophoretic deposition to deposit large diameter nano metal oxide particles.

5. The method for fabricating electrode structures on a substrate as claimed in claim 4, wherein the small diameter nano metal oxide particles have diameters between 5 nm and 50 nm and the large diameter nano metal oxide particles have diameters between 50 nm and 400 nm.

6. The method for fabricating electrode structures on a substrate as claimed in claim 1, further comprising a drying step and a sintering step, wherein the sintering step is performed at a temperature between 100° C. and 500° C.

7. A method for fabricating electrode structures on a substrate, comprising:
providing a transparent conductive substrate having a patterned metal layer thereon to define an electrode area, wherein the patterned metal layer is covered by a passivation glue and an electrode layer is formed in the electrode area;
performing a first electrophoretic deposition to deposit small diameter nano metal oxide particles to a space between the electrode layer and the passivation glue; and
performing a second electrophoretic deposition to deposit large diameter nano metal oxide particles.

8. The method for fabricating electrode structures on a substrate as claimed in claim 7, wherein the first electrophoretic deposition comprises:
providing a suspension of the small diameter nano metal oxide particles;
immersing the substrate into the suspension; and
applying an electric field by implementing the substrate as cathode and at least one anode to electrophoretically deposit the small diameter nano metal oxide particles to the space between the electrode layer and the passivation glue.

9. The method for fabricating electrode structures on a substrate as claimed in claim 7, wherein the second electrophoretic deposition comprises:
providing a suspension of the large diameter nano metal oxide particles;
immersing the substrate into the suspension; and
applying an electric field by implementing the substrate as cathode and at least one anode to electrophoretically deposit the large diameter nano metal oxide particles.

10. The method for fabricating electrode structures on a substrate as claimed in claim 7, wherein the nano metal oxide comprises titanium oxide, titanium dioxide, zinc oxide, tin oxide, silicon oxide or combinations thereof.

11. The method for fabricating electrode structures on a substrate as claimed in claim 7, wherein the small diameter nano metal oxide particles have diameters between 5 nm and 50 nm and the large diameter nano metal oxide particles have diameters between 50 nm and 400 nm.

12. The method for fabricating electrode structures on a substrate as claimed in claim 7, further comprising a drying step and a sintering step, wherein the sintering step is performed at a temperature between 100° C. and 500° C.

* * * * *